US008682554B2

(12) United States Patent
Takamatsu et al.

(10) Patent No.: US 8,682,554 B2
(45) Date of Patent: Mar. 25, 2014

(54) CONTROL DEVICE OF LOCK-UP CLUTCH

(75) Inventors: Masaaki Takamatsu, Wako (JP);
Yutaka Ishikawa, Wako (JP); Shinya Abe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 665 days.

(21) Appl. No.: 12/797,359

(22) Filed: Jun. 9, 2010

(65) Prior Publication Data

US 2010/0312444 A1 Dec. 9, 2010

(30) Foreign Application Priority Data

Jun. 9, 2009 (JP) ................................. 2009-138040

(51) Int. Cl.
*G06F 17/00* (2006.01)
(52) U.S. Cl.
USPC ...... 701/68; 701/98; 477/5; 477/32; 477/168; 477/169; 477/176; 180/65.2
(58) Field of Classification Search
USPC .................. 701/98; 477/5, 32, 168, 169, 176; 180/65.2
See application file for complete search history.

(56) References Cited

U.S. PATENT DOCUMENTS

| | | | |
|---|---|---|---|
| 5,021,958 A * | 6/1991 | Tokoro | 701/98 |
| 5,643,137 A * | 7/1997 | Suzuki | 477/169 |
| 6,341,679 B1 | 1/2002 | Abe et al. | |
| 2002/0006848 A1 * | 1/2002 | Tabata | 477/32 |
| 2002/0058565 A1 * | 5/2002 | Yamamoto et al. | 477/5 |
| 2003/0173125 A1 * | 9/2003 | Ishikawa | 180/65.2 |
| 2003/0195083 A1 * | 10/2003 | Tabata | 477/168 |
| 2006/0108163 A1 * | 5/2006 | Kitano et al. | 180/65.2 |
| 2008/0182721 A1 * | 7/2008 | Saitou et al. | 477/176 |

FOREIGN PATENT DOCUMENTS

| | | |
|---|---|---|
| JP | 2001-065685 A | 3/2001 |
| JP | 3476718 B2 | 9/2003 |
| JP | 2007-225048 A | 9/2007 |

* cited by examiner

*Primary Examiner* — James P Trammell
*Assistant Examiner* — Sanjeev Malhotra
(74) *Attorney, Agent, or Firm* — Arent Fox LLP

(57) ABSTRACT

A control device for controlling an engagement state of a lock-up clutch is provided. A plurality of target slip ratio maps include a normal slip ratio map having a characteristic line of a target slip ratio defined in accordance with an engine load at a normal vehicle running condition and a modified slip ratio map having a characteristic line of the target slip ratio to become a facing calorific value lower than a facing calorific value corresponding to the slip ratio retrieved from the normal slip ratio map. In the case where an estimate value of the facing temperature continues to exceed first threshold temperature for more than predetermined time when to carry out slip control using the normal slip ratio map, control to switch the target slip ratio map from the normal slip ratio map to the modified slip ratio map is carried out.

4 Claims, 6 Drawing Sheets

CONTROL DEVICE OF LOCK-UP CLUTCH

CROSS-REFERENCE TO RELATED APPLICATION

The present disclosure relates to subject matter contained in Japanese Patent Application No. 2009-138040, filed on Jun. 9, 2009, the disclosure of which is expressly incorporated herein by reference in its entirety.

BACKGROUND OF THE INVENTION

1. Field of the Invention

The present invention relates to a control device of a lock-up clutch for controlling an engagement state of the lock-up clutch with which a torque converter is provided, and particularly, the present invention relates to a control device capable of controlling rise in facing temperature due to slip control for the lock-up clutch.

2. Description of the Related Art

In an automatic transmission mounted on a vehicle, a torque converter for amplifying torque has been utilized. A lock-up clutch for directly connecting an impeller to a turbine is provided in most of the torque converters. By providing the lock-up clutch to the torque converter, power transmission efficiency is heightened and fuel economy is improved. However, in order to improve the fuel economy further, it is desired that an engagement region of the lock-up clutch is broadened. On the other hand, since variation in engine torque is directly transmitted to a drive system by means of engagement of the lock-up clutch, this causes an increase in noise or vibration.

Therefore, technique to inhibit transmission of the variation in the engine torque to the drive system by slipping the lock-up clutch slightly has been utilized. However, in the case where the lock-up clutch is continuously slipped, a surface of a friction member (facing member) becomes high temperature. This causes a mirrored process, abrasion, carbonization or the like of the friction member, and decrease of frictional force thereby occurs. Thus, there is a fear that a sufficient lock-up clutch capacity against the engine torque cannot be obtained. Further, when the surface of the friction member becomes high temperature, heat generation due to a work loss is increased by enlarging a slippage amount of the torque converter in addition to heat generation of the friction member. This causes hydraulic oil in the torque converter to become high temperature, thereby leading to acceleration of deterioration of a resin component or a rubber component. Further, when the rise in temperature in the torque converter becomes marked, there is a possibility that any hydraulic oil path in the torque converter is damaged in the worst-case scenario. In the event that such a situation occurs, a function to transmit the engine torque is markedly lowered.

In order to avoid such a phenomenon, Japanese Patent No. 3476718 discloses technique in which facing temperature of a lock-up clutch is estimated and temperature in a torque converter is lowered in the case where the facing temperature is estimated as high temperature. More specifically, in the case where the facing temperature of the lock-up clutch becomes high, by selecting either complete engagement of the lock-up clutch (slip ratio=zero) or complete release of engagement of the lock-up clutch, slip control for the lock-up clutch is suspended to lower the facing temperature and the internal temperature of the torque converter. However, there has been a problem as follows. In the case where the lock-up clutch completely engages, vibration and noise in driving force transmission is deteriorated. On the other hand, in the case where engagement of the lock-up clutch is completely released, fuel economy is deteriorated.

Further, U.S. Pat. No. 6,959,239 discloses technique as follows. Namely, internal temperature is estimated from a work loss of a torque converter (difference of workloads inputted into and outputted from the torque converter). In the case where the estimated internal temperature is high temperature, a slippage amount of the lock-up clutch is reduced to reduce the work loss, whereby oil temperature in the torque converter is lowered. However, facing temperature of the lock-up clutch depends not only upon the internal temperature of the torque converter but also upon other factors. Thus, in the case where the slippage amount of the lock-up clutch is controlled on the basis of the internal temperature estimated from the work loss of the torque converter, there is a fear that delay in timing to reduce the slippage amount occurs. Therefore, there has been a problem that the facing temperature cannot be controlled to become assumed temperature with high accuracy.

SUMMARY OF THE INVENTION

The present invention is made in view of the above points, and it is an object of the present invention to provide a control device of a lock-up clutch capable of effectively suppressing rise in facing temperature and rise in internal temperature of a torque converter while continuing slip control in the case where the facing temperature is raised by means of the slip control for the lock-up clutch.

In order to solve the problem described above, the present invention is directed to a control device of a lock-up clutch (40) for controlling an engagement state of the lock-up clutch (40). In this case, a torque converter (TC) mounted on a vehicle is provided with the lock-up clutch. The control device according to the present invention includes a facing temperature estimating section (10) for calculating an estimate value (TPLATELC) of facing temperature of the lock-up clutch.

The control device also includes a temperature comparing section (10) for comparing the estimate value (TPLATELC) of the facing temperature calculated by the facing temperature estimating section (10) with first threshold temperature (T1) defined in advance.

The control device also includes a storage section (11) for storing a plurality of target slip ratio maps (A, B, C), each of the target slip ratio maps (A, B, C) including a characteristic line of a target slip ratio for the lock-up clutch (40).

The control device also includes a slip control section (10) for controlling a slip ratio of the lock-up clutch (40) on the basis of the target slip ratio retrieved from the target slip ratio map (A, B, C).

In this case, the plurality of target slip ratio maps (A, B, C) include a normal slip ratio map (A) having a characteristic line of the target slip ratio defined in accordance with an engine load at a normal vehicle running condition and a modified slip ratio map (B, C) having a characteristic line of the target slip ratio to become a facing calorific value lower than a facing calorific value corresponding to the slip ratio retrieved from the normal slip ratio map (A).

Further, in the case where the estimate value (TPLATELC) of the facing temperature continues to exceed the first threshold temperature (T1) for more than predetermined time when to carry out slip control using the normal slip ratio map (A), the slip control section (10) carries out control to switch the target slip ratio map from the normal slip ratio map (A) to the modified slip ratio map (B or C).

According to the control device of the lock-up clutch of the present invention, in the case where the estimate value of the facing temperature continues to exceed the first threshold temperature for more than the predetermined time when the slip control for the lock-up clutch is carried out, switching of the target slip ratio map is carried out from the normal slip ratio map to the modified slip ratio map. Thus, it is possible to effectively suppress rise in facing temperature and rise in internal temperature of the torque converter while continuing slip control for the lock-up clutch. Therefore, it is possible to achieve endurance enhancement of the lock-up clutch and component parts of the torque converter, improvement of fuel economy and effective suppression of vibration and noise. Further, since switching of the target slip ratio map is carried out on the basis of the estimate value of the facing temperature, it is possible to carry out switching of the target slip ratio map at appropriate timing.

Further, in the control device of the lock-up clutch described above, it is preferable that distribution data of the facing calorific value corresponding to the slip ratio of the lock-up clutch (40) are further stored in the storage section (11); the modified slip ratio map (B, C) includes a first modified slip ratio map (B) having a characteristic line of a target slip ratio larger than the target slip ratio on the normal slip ratio map (A) and a second modified slip ratio map (C) having a characteristic line of a target slip ratio smaller than the target slip ratio on the normal slip ratio map (A); the slip control section (10) determines whether a current facing calorific value is in a decreasing tendency or an increasing tendency against an increase in the slip ratio on the basis of the distribution data of the facing calorific value; and the slip control section (10) selects the first modified slip ratio map (B) in the case where the current facing calorific value is in the decreasing tendency against the increase in the slip ratio, and the slip control section (10) selects the second modified slip ratio map (C) in the case where the current facing calorific value is in the increasing tendency.

Alternatively, in the control device of the lock-up clutch described above, it is preferable that the normal slip ratio map (A) includes a first normal slip ratio map (A1) set up so as to use only the slip ratio in a region in which the facing calorific value of the lock-up clutch (40) is in a decreasing tendency against an increase in the slip ratio, and a second normal slip ratio map (A2) set up so as to use only the slip ratio in a region in which the facing calorific value is in an increasing tendency against an increase in the slip ratio; the modified slip ratio map (B, C) includes a first modified slip ratio map (B) having a characteristic line of a target slip ratio larger than the target slip ratio on the normal slip ratio map (A), and a second modified slip ratio map (C) having a characteristic line of a target slip ratio smaller than the target slip ratio on the normal slip ratio map (A); the slip control section (10) determines whether the normal slip ratio map (A) that is currently selected is the first normal slip ratio map (A1) or the second normal slip ratio map (A2); and the slip control section (10) selects the first modified slip ratio map (B) as the modified slip ratio map (B, C) in the case where the normal slip ratio map (A) that is currently selected is the first normal slip ratio map (A1), and the slip control section (10) selects the second modified slip ratio map (C) in the case where the normal slip ratio map (A) currently selected is the second normal slip ratio map (A2).

According to these configurations, after determining whether the facing calorific value is in the decreasing tendency or increasing tendency against a change in the slip ratio on the basis of the current target slip ratio, it is possible to select one modified slip ratio map, by which it is expected that the facing calorific value is lowered. Therefore, it is possible to lower the facing temperature of the lock-up clutch quickly and surely.

Further, in the control device of the lock-up clutch according to the present invention, it is preferable that the temperature comparing section (10) is further adapted to compare the estimate value (TPLATELC) of the facing temperature with second threshold temperature (T2) lower than the first threshold temperature (T1); and in the case where the estimate value (TPLATELC) of the facing temperature continues to fall below the second threshold temperature (T2) for more than predetermined time after carrying out the control to switch the target slip ratio map, the slip control section (10) again carries out control to switch the target slip ratio map from the modified slip ratio map (B or C) to the normal slip ratio map (A).

According to this configuration, in the case where the estimate value of the facing temperature is lowered to become an acceptable range by means of switching of the slip ratio map to the modified slip ratio map, the slip ratio of the lock-up clutch is returned to the normal slip ratio. Thus, it is possible to further improve fuel economy and to effectively suppress vibration and noise. In particular, by preparing the target slip ratio map capable of optimizing driving force and fuel economy of the vehicle as the normal slip ratio map, it is possible to effectively achieve both optimization of the driving force and fuel economy of the vehicle by the normal slip ratio map and suppression of rise in the facing temperature by the modified slip ratio map.

In this regard, reference numerals in parenthesis here are shown as one example of the present invention to indicate reference numerals of corresponding components of an embodiment (will be described later).

According to the control device of the lock-up clutch of the present invention, it is possible to effectively suppress rise in facing temperature and rise in internal temperature of a torque converter while continuing slip control in the case where the facing temperature is raised due to the slip control for the lock-up clutch.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Figure 1:
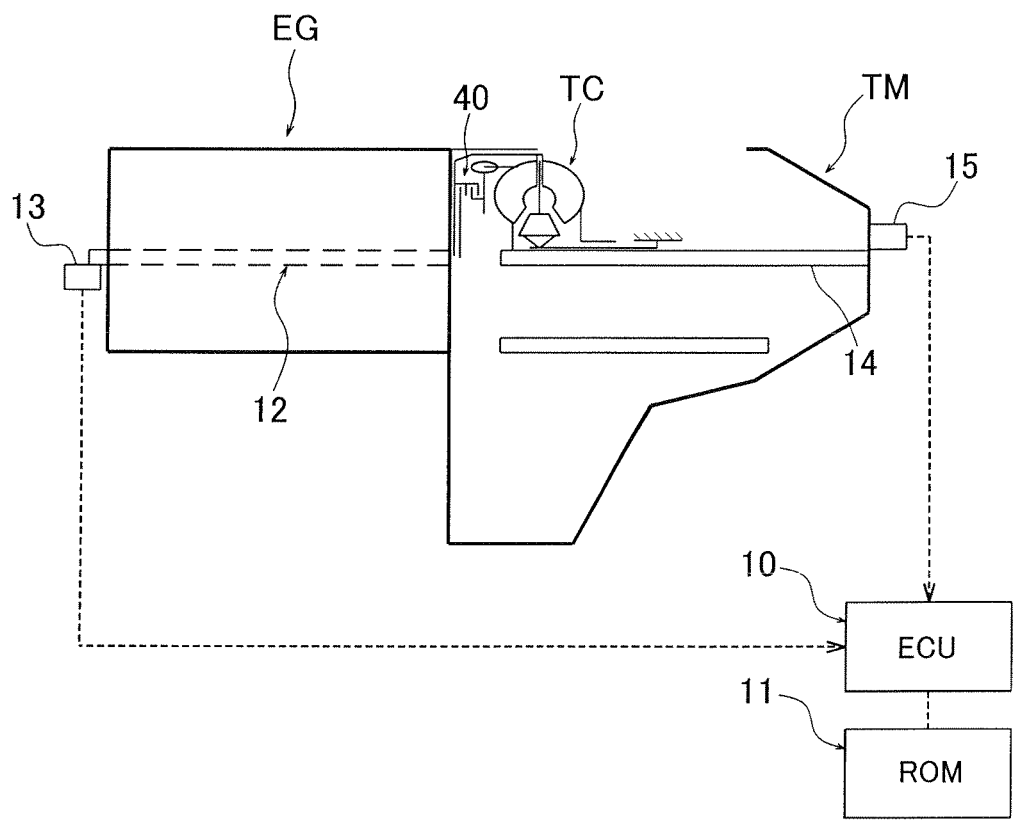
FIG. 1 is a view showing a schematic configuration of a drive system mounted on a vehicle.

Hereinafter, an embodiment of the present invention will be described in detail with reference to the appending drawings. FIG. 1 is a view showing a schematic configuration of a drive system mounted on a vehicle. A drive system shown in FIG. 1 is configured so as to include an engine EG, an automatic transmission TM and a torque converter TC for connecting the engine EG to the automatic transmission TM. A lock-up clutch 40 is provided in the torque converter TC. Further, an electronic control unit (hereinafter, referred to as an "ECU") 10 for carrying out control for the automatic transmission TM including the torque converter TC and a ROM (storage section) 11 for storing data required for control by the ECU 10 are provided. Further, a crank shaft revolution indicator 13 for detecting the number of revolutions of a crank shaft 12 and a main shaft revolution indicator 15 for detecting the number of revolutions of a main shaft 14 are installed.

The ECU 10 is adapted to input a detected signal of the number of revolutions of the crank shaft 12 detected by the crank shaft revolution indicator 13 (the number of revolutions of the engine EG=the number of revolutions of input of the torque converter TC) and a detected signal of the number of revolutions of the main shaft 14 detected by the main shaft revolution indicator 15 (the number of revolutions of output of the torque converter TC) thereinto. The ECU 10 is adapted to receive, in addition to the number of revolutions of the crank shaft 12 and the number of revolutions of the main shaft 14, a throttle opening degree signal, a vehicle speed signal and the like detected by other detecting sections (not shown in the drawings) to carry out computing of a control signal for the automatic transmission TM, and to carry out control for a hydraulic circuit 20 (will be described later) using the computing result. The ECU 10 thus functions as a facing temperature estimating section for calculating an estimate value of facing temperature of the lock-up clutch 40, a temperature comparing section for comparing the estimate value of the facing temperature with threshold temperature defined in advance and a slip control section for controlling a slip ratio of the lock-up clutch 40 on the basis of a target slip ratio map, as will be described later.

Figure 2:
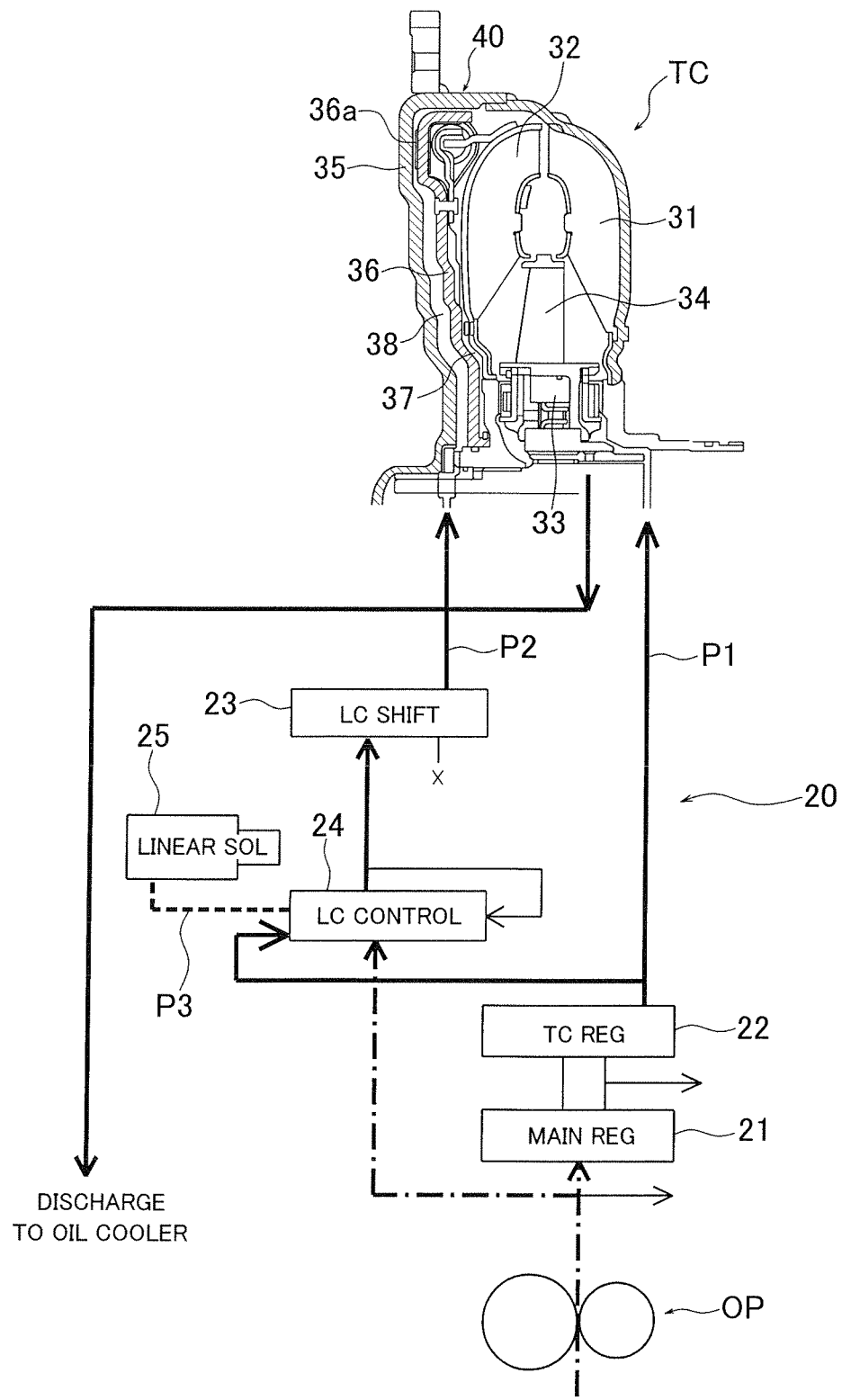
FIG. 2 is a view showing a torque converter and a hydraulic circuit for carrying out control the torque converter.

FIG. 2 is a view showing the torque converter TC and the hydraulic circuit 20 for carrying out control for the torque converter TC. The torque converter TC includes: a pump impeller 31 connected to the crank shaft 12 (see FIG. 1); a turbine runner 32 connected to the main shaft 14 (see FIG. 1); a stator 34 supported at a fixed side via a one-way clutch 33; and the lock-up clutch 40. The lock-up clutch 40 includes a clutch piston 36 that can abut on an inner surface of a torque converter cover 35 via a friction member 36a. A first oil chamber 37 in communication with the inside of the torque converter TC and a second oil chamber (piston chamber) 38 formed in a space between the torque converter cover 35 and the clutch piston 36 are respectively provided at both sides of the clutch piston 36.

When the clutch piston 36 abuts on the torque converter cover 35 by supplying hydraulic pressure to the first oil chamber 37, the lock-up clutch 40 engages, whereby torque from the crank shaft 12 is directly transmitted to the main shaft 14. On the other hand, when the clutch piston 36 is spaced from the torque converter cover 35 by supplying the hydraulic pressure to the second oil chamber 38, engagement of the lock-up clutch 40 is released, whereby mechanical connection between the crank shaft 12 and the main shaft 14 is cut off.

The hydraulic circuit 20 for carrying out such control for operations for the lock-up clutch 40 is configured so as to include: an oil pump OP that supplies hydraulic oil from an oil tank (not shown in the drawings); a main regulator valve 21 and a torque converter regulator valve 22 each of which regulates supply pressure from the oil pump OP; an LC shift valve 23 that carries out supply control for the hydraulic oil regulated at the torque converter regulator valve 22 to the first oil chamber 37 and the second oil chamber 38; an LC control valve 24 for controlling hydraulic pressure of the hydraulic oil supplied to the second oil chamber 38; a linear solenoid valve 25 for supplying signal pressure to the LC control valve 24; and the like.

In the lock-up clutch 40, a lock-up capacity (engagement force of the lock-up clutch 40) is generated due to differential pressure between the first oil chamber 37 and the second oil chamber 38. Namely, discharge pressure (line pressure) of the hydraulic oil discharged from the oil pump OP is regulated by the torque converter regulator valve 22, and this regulated hydraulic oil flows into the first oil chamber 37 of the lock-up clutch 40 by way of the inside of the torque converter TC as shown by internal pressure P1 of FIG. 2. On the other hand, the hydraulic oil regulated by the torque converter regulator valve 22 is regulated to pressure required at the LC control valve 24 as shown by piston pressure P2 of FIG. 2, and flows into the second oil chamber 38 of the lock-up clutch 40 via the LC shift valve 23.

The LC shift valve 23 controls on/off of the hydraulic pressure to the second oil chamber 38 to switch on/off (engagement/release) of the lock-up clutch 40. On the other hand, linear solenoid pressure P3 is applied to the LC control valve 24 as pilot pressure. By changing a pressure-adjusting point (regulation point) of the LC control valve 24 using this linear solenoid pressure P3, internal pressure of the second oil chamber 38 is controlled. This causes engagement force of the lock-up clutch 40 to be adjusted, whereby slip control is carried out.

Figure 3:
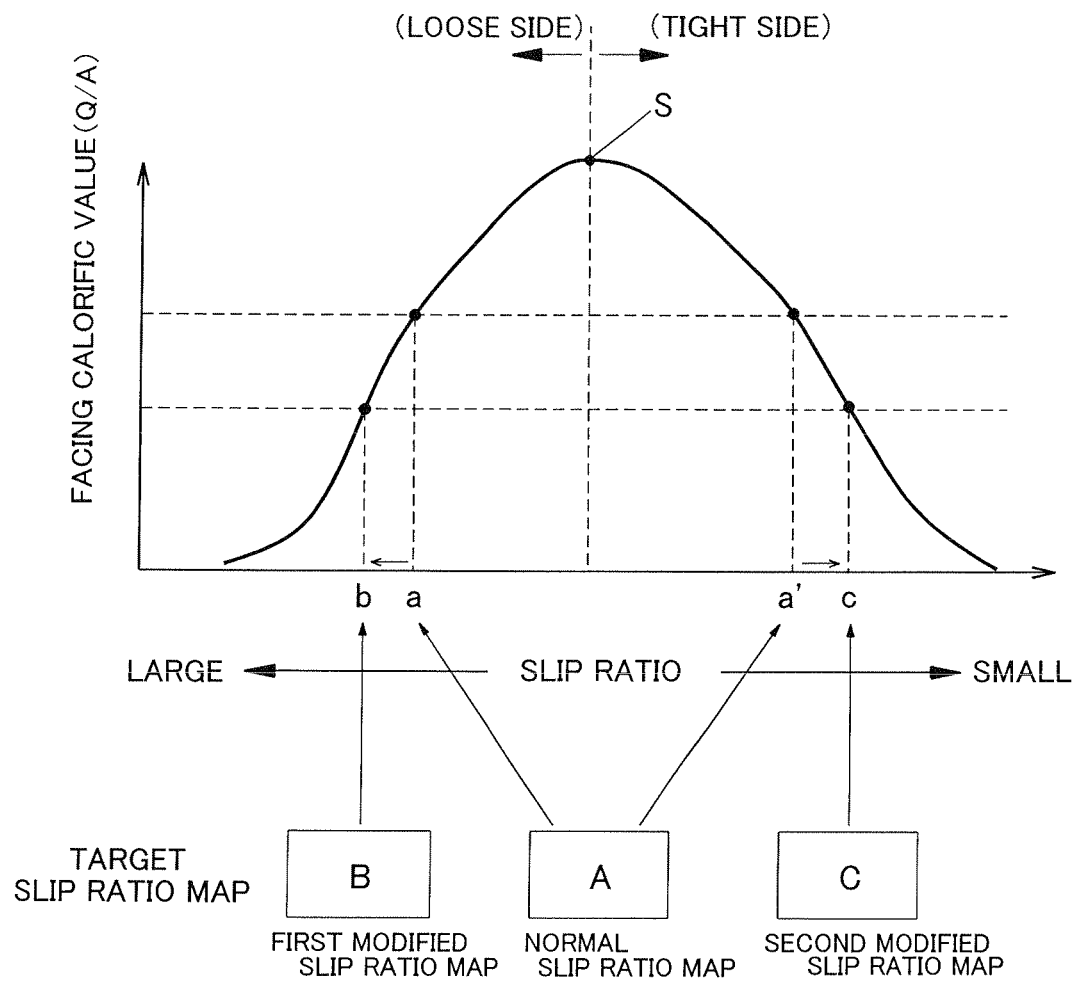
FIG. 3 is a graph showing a relationship between a slip ratio of a lock-up clutch and calculated value of a facing calorific value.

In the case where the slip control for the lock-up clutch 40 is carried out in this manner, heat (facing heat) is generated due to friction between the friction member 36a attached to the clutch piston 36 and the inner surface of the torque converter cover 35. FIG. 3 is a graph showing distribution of a calculated value of a facing calorific value with respect to a slip ratio of the lock-up clutch 40. A facing calorific value (Q/A) herein is a calorific value (cal/cm$^2$/sec) per unit surface area and unit time of the friction member 36a that is in contact with the inner surface of the torque converter cover 35. In this regard, the facing calorific value shown in FIG. 3 is distribution of calorific values defined from a relationship among engine torque, the number of revolutions of the torque converter TC (the number of revolutions of the engine EG) and a slip ratio of the lock-up clutch 40. This distribution of the facing calorific value is mountain-shaped distribution having a boundary point (inflection point) S at which a change in the facing calorific value is switched from an increase to a decrease with respect to an increase or a decrease of the slip ratio. Therefore, in a region in which the slip ratio is smaller than the boundary point S (region at a tight side), the facing calorific value decreases as the slip ratio decreases. On the other hand, in a region in which the slip ratio is larger than the boundary point S (region at a loose side), the facing calorific value decreases as the slip ratio increases.

In the slip control for the lock-up clutch 40, when a state in which the facing temperature is high continues for a long time, a mirrored process, abrasion, carbonization or the like of the surface of the friction member 36a may occur. There is a fear that this causes frictional force of the lock-up clutch 40 to be lowered, or causes durability of component parts to be deteriorated. Further, there is a fear that a sufficient lock-up clutch capacity against engine torque cannot be obtained due to a decrease in the frictional force of the lock-up clutch 40. Further, there is a concern about an increase in heat generation due to a work loss of the torque converter TC by increasing the slippage amount of the torque converter TC in addition to the heat generation of the friction member 36a. Therefore, in the control device of the lock-up clutch 40 according to the present embodiment, the facing calorific value can be suppressed into a predetermined range by carrying out control to switch target slip ratios of the lock-up clutch 40 in accordance with an estimate value of the facing temperature when to carry out the slip control for the lock-up clutch 40.

The control device of the lock-up clutch 40 according to the present embodiment holds a plurality of slip ratio maps (feedback target slip ratio maps) for causing a slip ratio of the lock-up clutch 40 to approach a target slip ratio. The slip ratio maps are stored in the ROM 11. In each of the slip ratio maps, characteristic lines of plural kinds of slip ratios obtained from the engine torque and the number of revolutions of the torque converter TC are included. There is a normal slip ratio map A shown in FIG. 3 as such a slip ratio map. The normal slip ratio map A is a slip ratio map having a characteristic line of a target slip ratio defined in accordance with an engine load at a normal vehicle running condition. In this regard, here, it is desired that the normal slip ratio map A is set to a slip ratio map capable of optimizing driving force and fuel economy of the vehicle. However, the normal slip ratio map A may not necessarily be a map of a slip ratio capable of optimizing the driving force and fuel economy of the vehicle so long as it is a map for a target slip ratio that can be selected in a normal running condition of the vehicle.

Further, the control device according to the present embodiment also holds, as a slip ratio map, a modified slip ratio map having a characteristic line of a slip ratio capable of reducing the facing calorific value compared with the normal slip ratio map A. The modified slip ratio map includes, as shown in FIG. 3, a first modified slip ratio map (loose side slip ratio map) B having a characteristic line of a slip ratio larger than that on the normal slip ratio map A and a second modified slip ratio map (tight side slip ratio map) C having a characteristic line of a slip ratio smaller than that on the normal slip ratio map A. Hereinafter, the case where control to switch slip ratio maps (that is, switching of target slip ratios) is carried out when the slip control for the lock-up clutch 40 is carried out using the normal slip ratio map A will be described.

Figure 4:
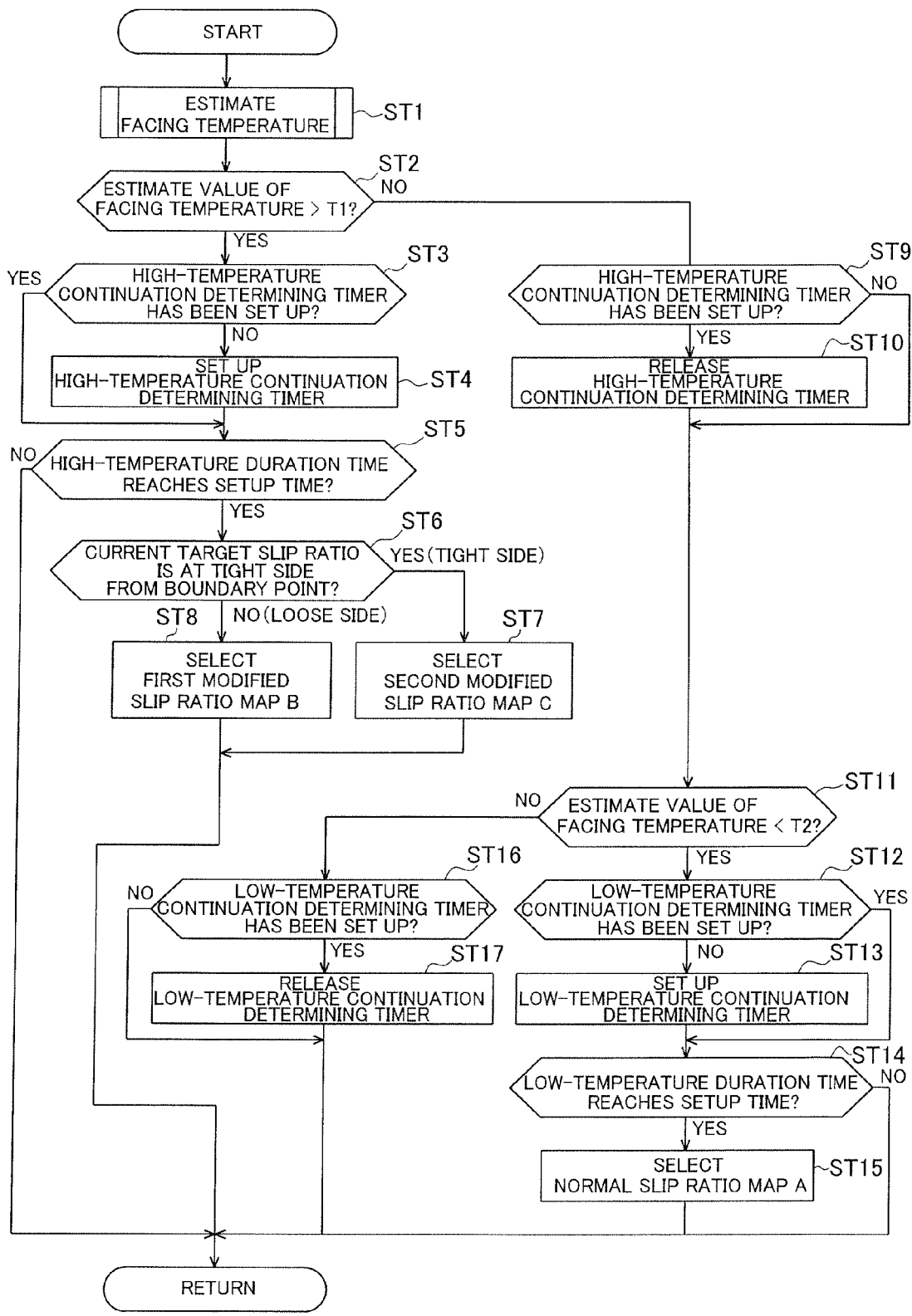
FIG. 4 is a flowchart showing procedures to shift (or switch) slip ratio maps of the lock-up clutch.
Figure 5:
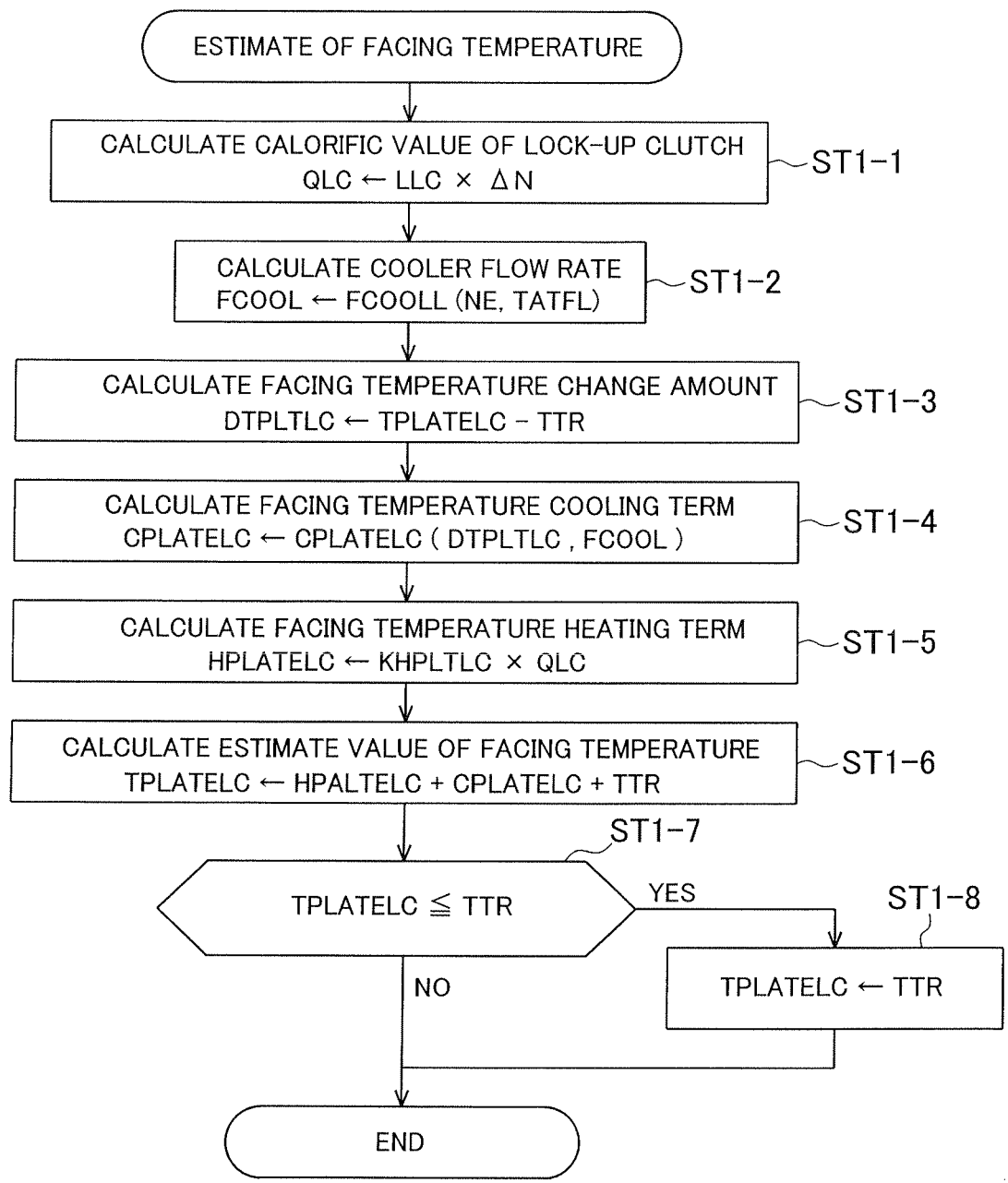
FIG. 5 is a flowchart showing procedures to calculate an estimate value of facing temperature.
Figure 6:
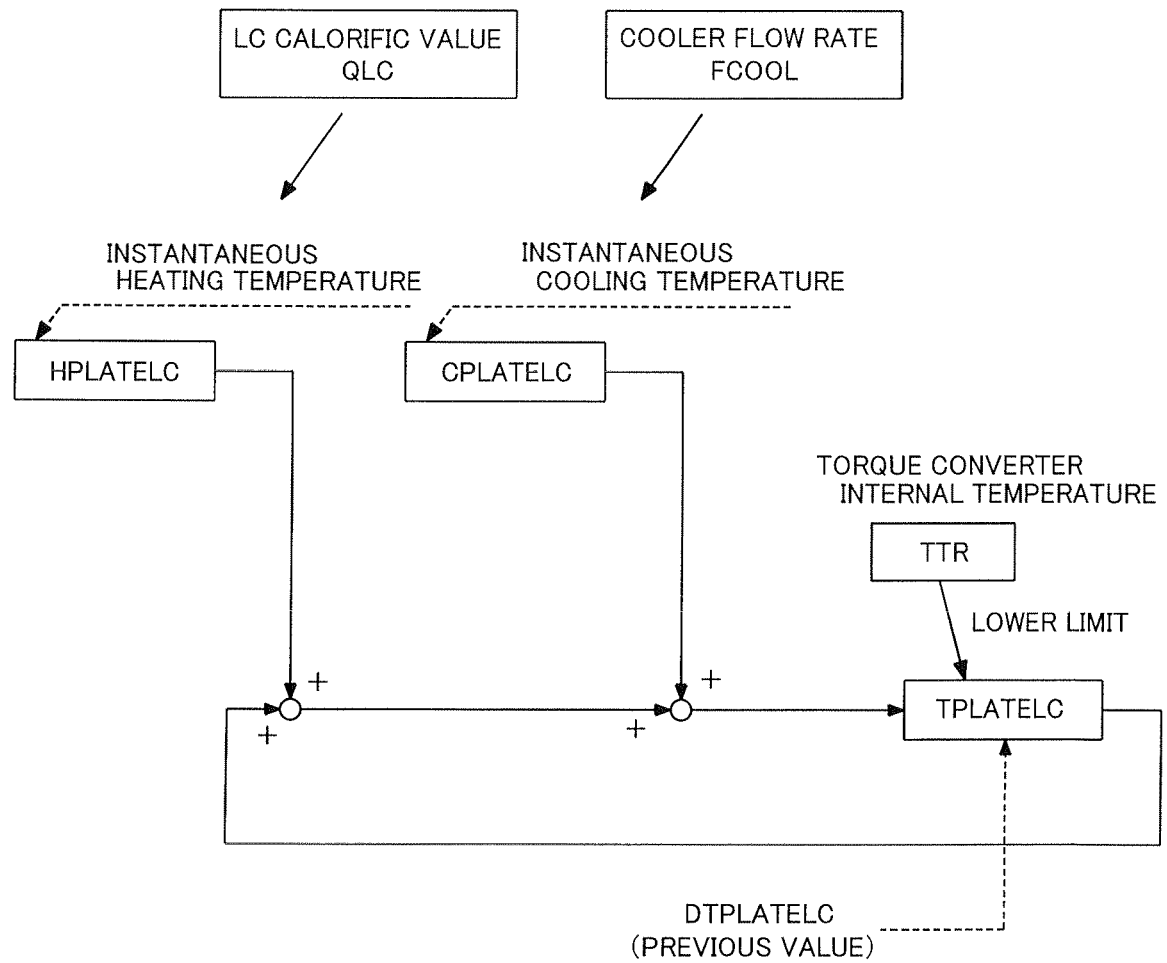
FIG. 6 is a view in which the procedures to calculate the estimate value of the facing temperature are illustrated.

FIG. 4 is a flowchart (main flow) showing shifting (or switching) control for the target slip ratio. In the shifting control for the target slip ratio, an estimate value TPLATELC of facing temperature of the lock-up clutch 40 is first calculated (Step ST1). FIG. 5 is a flowchart showing procedures to calculate the estimate value TPLATELC of facing temperature (subroutine). FIG. 6 is a view in which the procedures to calculate the estimate value TPLATELC of the facing temperature are illustrated. In the calculation of the estimate value TPLATELC of facing temperature, the ECU 10 first calculates a calorific value QLC of the lock-up clutch 40 (Step ST1-1). The calorific value QLC of the lock-up clutch 40 is calculated by means of a product of a lock-up clutch capacity LLC and a lock-up clutch rotation difference (rotation difference of a pump and a turbine in the torque converter TC) ΔN. The lock-up clutch capacity LLC is calculated using the following expressions (1) and (2).

$$LLC = T_E \times T_{pump} \quad (1)$$

$$T_{pump} = \tau \times (Ne/1000)^2 \quad (2)$$

Here, the term TE denotes engine torque, the term $T_{pump}$ denotes pump absorption torque, the term τ denotes a coefficient (capacity coefficient of the torque converter TM obtained from a ratio of the number of revolutions of the input and output of the torque converter TC), and the term Ne denotes the number of revolutions of the engine EG.

Further, the lock-up clutch rotation difference ΔN is calculated from a difference between the number of revolutions Ne of the engine EG (the number of revolutions of the input of the torque converter TC) detected by the crank shaft revolution indicator 13 and the number of revolutions Nm of the input of the automatic transmission TM (the number of revolutions of the output of the torque converter TC) detected by the main shaft revolution indicator 15.

Next, the ECU 10 calculates a cooler flow rate (oil cooler flow rate) FCOOL (Step ST1-2). The cooler flow rate FCOOL can be retrieved from a map of oil temperature TATFL of the hydraulic oil flowing into the inside of the torque converter TC and the number of revolutions Ne of the engine EG. Further, the ECU 10 calculates a facing temperature change amount DTPLTLC by means of computing (Step ST1-3). The facing temperature change amount DTPLTLC is calculated by subtracting torque converter internal temperature TTR from the estimate value TPLATELC of the facing temperature that has been calculated previously. Further, the ECU 10 calculates a facing temperature cooling term CPLATELC by means of computing (Step ST1-4). The facing temperature cooling term CPLATELC can be retrieved from a map of the facing temperature change amount DTPLTLC calculated at Step ST1-3 and the cooler flow rate FCOOL calculated at Step ST1-2. Further, the ECU 10 calculates a facing temperature heating term HPLATELC (Step ST1-5). The facing temperature heating term HPLATELC is calculated by means of a product of the lock-up clutch calorific value QLC calculated at Step ST1-1 and specific heat KHPLTLC.

Subsequently, the ECU 10 calculates the estimate value TPLATELC of the facing temperature (Step ST1-6). The estimate value TPLATELC of the facing temperature is calculated from a sum of the facing temperature heating term HPLATELC calculated at Step ST1-5, the facing temperature cooling term CPLATELC calculated at Step ST1-4 and the torque converter internal temperature TTR. After calculating the estimate value TPLATELC of the facing temperature in this manner, the ECU 10 determines whether or not the estimate value TPLATELC of the facing temperature is the torque converter internal temperature TTR or lower (Step ST1-7). As a result, in the case where it is determined that the estimate value TPLATELC of the facing temperature is the torque converter internal temperature TTR or lower (YES), the ECU 10 replaces the estimate value TPLATELC of the facing temperature by the torque converter internal temperature TTR (Step ST1-8). On the other hand, in the case where it is determined that the estimate value TPLATELC of the facing temperature is higher than the torque converter internal temperature TTR (NO), the ECU 10 uses the calculated estimate value TPLATELC of the facing temperature as it is.

Next, returning to the main flow of FIG. 4, the ECU 10 determines whether the estimate value TPLATELC of the facing temperature calculated at Step ST1 is higher than first threshold temperature T1 or not (Step ST2). The first threshold temperature T1 herein is temperature by which it is determined that a state where the facing temperature exceeds the first threshold temperature T1 is kept for more than predetermined time, whereby there is a fear that defects such as a mirrored process, abrasion, or carbonization of a surface of the friction member 36a occur. As a result, in the case where it is determined that the estimate value TPLATELC of the facing temperature is higher than the first threshold temperature T1 ("YES" at Step ST2), the ECU 10 determines whether a high-temperature continuation determining timer has already been set up or not (Step ST3). In the case where it is determined that the high-temperature continuation determining timer has not been set up yet (NO), the ECU 10 sets up the high-temperature continuation determining timer (Step ST4). The high-temperature continuation determining timer herein is a timer for measuring duration time (hereinafter, referred to as "high-temperature duration time") at a state where the estimate value (TPLATELC) of the facing temperature becomes higher than the first threshold temperature T1.

The ECU 10 then determines whether the high-temperature duration time reaches setup time or not (Step ST5). In the case where it is determined that the high-temperature duration time reaches the setup time ("YES" at Step ST5), the ECU 10 subsequently determines whether a target slip ratio by the normal slip ratio map A currently selected is at a tight side from the boundary point S in the graph of FIG. 3 or not (Step ST6).

As a result, in the case where it is determined that the current slip ratio by the normal slip ratio map A is a slip ratio (for example, slip ratio a') at the tight side from the boundary point S ("YES" at Step ST6), the ECU 10 carries out control to switch to the second modified slip ratio map (tight side slip ratio map) C in which a slip ratio smaller than the current one can be retrieved (Step ST7). Namely, when the current target slip ratio by the normal slip ratio map A is in a region at the tight side from the boundary point S, the facing calorific value decreases as the slip ratio decreases. Thus, the facing calorific value can be reduced by making the target slip ratio smaller. Therefore, the ECU 10 selects the second modified slip ratio map C having the characteristic line of the target slip ratio smaller than that on the normal slip ratio map A.

On the other hand, in the case where it is determined that the current target slip ratio by the normal slip ratio map A is at the loose side (for example, slip ratio a) from the boundary point S ("NO" at Step ST6), the ECU 10 carries out control to switch to the first modified slip ratio map B in which a slip ratio larger than the current slip ratio can be retrieved (Step ST8). Namely, when the current target slip ratio by the normal slip ratio map A is in a region at the loose side from the boundary point S, the facing calorific value decreases as the slip ratio increases. Thus, the facing calorific value can be reduced by making the target slip ratio larger. Therefore, the ECU 10 selects the first modified slip ratio map B having the characteristic line of the target slip ratio larger than that on the normal slip ratio map A.

On the other hand, in the case where it is determined at Step ST2 that the estimate value TPLATELC of the facing temperature is lower than the first threshold temperature T1 ("NO" at Step ST2), it is determined whether the high-temperature continuation determining timer has already been set up or not (Step ST9). In the case where it is determined that the high-temperature continuation determining timer has already been set up (YES), the ECU 10 releases the high-temperature continuation determining timer (Step ST10). On the other hand, in the case where it is determined that the high-temperature continuation determining timer has not been set up yet ("NO" at Step ST9), the processing flow directly proceeds to next step.

The ECU 10 then determines whether the estimate value TPLATELC of the facing temperature is lower than second threshold temperature T2 or not (Step ST11). The second threshold temperature T2 herein is temperature lower than the first threshold temperature T1 (T1>T2). As a result, in the case where it is determined that the estimate value TPLATELC of the facing temperature is lower than the second threshold temperature T2 ("YES" at Step ST11), the ECU 10 determines whether a low-temperature continuation determining timer has already been set up or not (Step ST12). In the case where it is determined that the low-temperature continuation determining timer has not been set up yet (NO), the ECU 10 sets up the low-temperature continuation determining timer (Step ST13). The low-temperature continuation determining timer herein is a timer for measuring elapsed time since the estimate value TPLATELC of the facing temperature becomes lower than the second threshold temperature T2 (hereinafter, referred to as "low-temperature duration time"). The ECU 10 then determines whether the low-temperature duration time reaches setup time or not (Step ST14). In the case where it is determined that the low-temperature duration time reaches the setup time ("YES" at Step ST14), the ECU 10 again carries out control to switch the target slip ratio map from the modified slip ratio map B (or C) to the normal slip ratio map A (Step ST15). This makes it possible to return the slip ratio of the lock-up clutch 40 to the normal slip ratio.

On the other hand, in the case where it is determined at Step ST11 that the estimate value (TPLATELC) of the facing temperature is higher than the second threshold temperature T2 ("NO" at Step ST11), the ECU 10 holds the modified slip ratio map B (or C) that has previously been switched as it is. Namely, in this case, the ECU 10 determines whether the low-temperature continuation determining timer has already been set up or not (Step ST16). In the case where it is determined that the low-temperature continuation determining timer has already been set up ("YES" at Step ST16), the ECU 10 releases the low-temperature continuation determining timer (Step ST17), and the processing flow returns to Step ST1. In the case where it is determined that the low-temperature continuation determining timer has not been set up ("NO" at Step ST16), the processing flow directly returns to Step ST1.

As explained above, in the control device according to the present embodiment, in the case where the estimate value TPLATELC of the facing temperature continues to exceed the first threshold temperature T1 for more than the predetermined time in the slip control for the lock-up clutch 40, the target slip ratio map is switched from the normal slip ratio map A to the modified slip ratio map B (or C). Thus, it is possible to effectively suppress rise in the facing temperature and rise in the internal temperature of the torque converter TC while continuing the slip control for the lock-up clutch 40. Therefore, it is possible to achieve endurance enhancement of the lock-up clutch 40 and component parts of the torque converter TC, improvement of fuel economy and effective suppression of vibration and noise.

Further, the modified slip ratio map is composed of the first modified slip ratio map B having the characteristic line of the target slip ratio larger than the target slip ratio of the normal slip ratio map A and the second modified slip ratio map C having the characteristic line of the target slip ratio smaller than the target slip ratio of the normal slip ratio map A. Therefore, after grasping whether the current facing calorific value is in the increasing tendency or decreasing tendency against a change in the slip ratio (increase or decrease) on the basis of distribution data of the facing calorific value shown in FIG. 3, it is possible to select one modified slip ratio map, by which it is determined that the facing calorific value is lowered, from the first modified slip ratio map B and the second modified slip ratio map C. This makes it possible to lower the facing temperature of the lock-up clutch 40 quickly and surely.

Further, in the control device according to the present embodiment, in the case where the estimate value TPLATELC of the facing temperature is lowered to become an acceptable range after switching to the modified slip ratio map B (or C), switching to the normal slip ratio map A is carried out again to return the slip ratio of the lock-up clutch 40 to the normal slip ratio. Thus, it is possible to further improve fuel economy and to effectively suppress vibration and noise. In particular, by preparing the target slip ratio map capable of optimizing driving force and fuel economy of the vehicle as the normal slip ratio map A, both optimization of the driving force and fuel economy of the vehicle by the normal slip ratio map A and suppression of rise in the facing temperature by the modified slip ratio map B (or C) become possible.

In this regard, in the embodiment described above, it is determined whether to switch either the first modified slip ratio maps B or second modified slip ratio maps C when to switch the slip ratio map on the basis of the distribution data on the facing calorific value shown in FIG. 3. However, the determination to switch either the first modified slip ratio map B or the second modified slip ratio map C can be carried out by other method. Hereinafter, a concrete example of the other method will be described.

The normal slip ratio map A shown in FIG. 3 has been set up so that the slip ratio lies on both the loose side and the tight side with respect to the boundary point S. However, this normal slip ratio map A is subdivided into two maps, for example, and a first normal slip ratio map A1 and a second normal slip ratio map A2 are prepared separately. The first normal slip ratio map A1 is set up so as to be used for slip ratios only in the loose side from the boundary point S. The second normal slip ratio map A2 is set up so as to be used for slip ratios only in the tight side from the boundary point S. This makes it possible to determine whether target setting of a current slip ratio is in the loose side or the tight side with respect to the boundary point S on the basis of a called name (that is, map name) A1 or A2 of the normal slip ratio map currently used. Therefore, it is possible to switch either the first modified slip ratio map B or the second modified slip ratio map C depending upon this determination.

According to this configuration, it is possible to switch slip ratio maps without referring to the distribution data of the facing calorific value. The distribution data of the facing calorific value shown in FIG. 3 are actually data to be changed using the engine torque and the number of output revolutions as parameters. Thus, in the case where distribution data of the facing calorific value for various driving situations of the vehicle are contained (prepared), the amount of data thereof becomes larger volumes. Therefore, by switching the slip ratio map between the called names A1 and A2 of the normal slip ratio map as described above, there is no need to hold larger volumes of the distribution data of the facing calorific value. This makes it possible to reduce (or save) the capacity of the ROM 11 for that amount.

As explained above, according to the control device of the lock-up clutch of the present embodiment, it is possible to effectively suppress rise in the facing temperature and rise in the internal temperature of the torque converter TC while continuing slip control for the lock-up clutch 40. Therefore, it is possible to achieve endurance enhancement of the lock-up clutch 40 and component parts of the torque converter TC, improvement of fuel economy and effective suppression of vibration and noise.

Although the embodiments of the present invention have been explained above, the present invention is not limited to the above embodiment. Various modifications can be made in a scope of the technical idea described in the following claims, the specification described above and the accompanying drawings without departing from the spirit and scope of the present invention.

What is claimed is:

1. A control device of a lock-up clutch for controlling an engagement state of the lock-up clutch, a torque converter mounted on a vehicle being provided with the lock-up clutch, the control device comprising:
    a facing temperature estimating section for calculating an estimated value of facing temperature of the lock-up clutch;
    a temperature comparing section for comparing the estimated value of the facing temperature calculated by the facing temperature estimating section with first threshold temperature defined in advance;
    a storage section for storing a plurality of target slip ratio maps, each of the target slip ratio maps including a characteristic line of a target slip ratio for the lock-up clutch; and
    a slip control section for controlling a slip ratio of the lock-up clutch on the basis of the target slip ratio retrieved from one of the plurality of target slip ratio maps,
    wherein the plurality of target slip ratio maps include a normal slip ratio map having a characteristic line of the target slip ratio defined in accordance with an engine load at a normal vehicle running condition and a modified slip ratio map having a characteristic line of the target slip ratio to become a facing calorific value lower than a facing calorific value corresponding to the slip ratio retrieved from the normal slip ratio map, and
    wherein, the slip control section carries out control to switch the target slip ratio map from the normal slip ratio map to the modified slip ratio map in the case where the estimated value of the facing temperature continues to exceed the first threshold temperature for more than a predetermined time when using the normal slip ratio map; and
    wherein the modified slip ratio map includes a first modified slip ratio map having a characteristic line of the target slip ratio larger than the target slip ratio on the normal slip ratio map and a second modified slip ratio map having a characteristic line of the target slip ratio smaller than the target slip ratio on the normal slip ratio map.

2. The control device according to claim 1, wherein distribution data of the facing calorific value corresponding to the slip ratio of the lock-up clutch are further stored in the storage section,
    wherein the slip control section determines whether a current facing calorific value is in a decreasing tendency or an increasing tendency against an increase in the slip ratio on the basis of the distribution data of the facing calorific value, and
    wherein the slip control section selects the first modified slip ratio map in the case where the current facing calorific value is in the decreasing tendency against the increase in the slip ratio, and the slip control section selects the second modified slip ratio map in the case where the current facing calorific value is in an increasing tendency.

3. The control device according to claim 1, wherein the normal slip ratio map includes a first normal slip ratio map set up so as to use only the slip ratio in a region in which the facing calorific value of the lock-up clutch is in a decreasing tendency against an increase in the slip ratio, and a second normal slip ratio map set up so as to use only the slip ratio in a region in which the facing calorific value is in an increasing tendency against an increase in the slip ratio, wherein the modified slip ratio map includes a first modified slip ratio map having a characteristic line of the target slip ratio larger than the target slip ratio on the normal slip ratio map, and a second modified slip ratio map having a characteristic line of the target slip ratio smaller than the target slip ratio on the normal slip ratio map, wherein the slip control section determines whether the normal slip ratio map that is currently selected is the first normal slip ratio map or the second normal slip ratio map, and wherein the slip control section selects the first modified slip ratio map as the modified slip ratio map in the case where the normal slip ratio map that is currently selected is the first normal slip ratio map, and the slip control section selects the second modified slip ratio map in the case where the normal slip ratio map currently selected is the second normal slip ratio map.

4. The control device according to claim 1, wherein the temperature comparing section is further adapted to compare the estimated value of the facing temperature with second threshold temperature lower than the first threshold temperature, and wherein, in the case where the estimated value of the facing temperature continues to fall below the second threshold temperature for more than the predetermined time after carrying out the control to switch the target slip ratio map, the slip control section again carries out control to switch the target slip ratio map from the modified slip ratio map to the normal slip ratio map.

* * * * *